Figure 1:
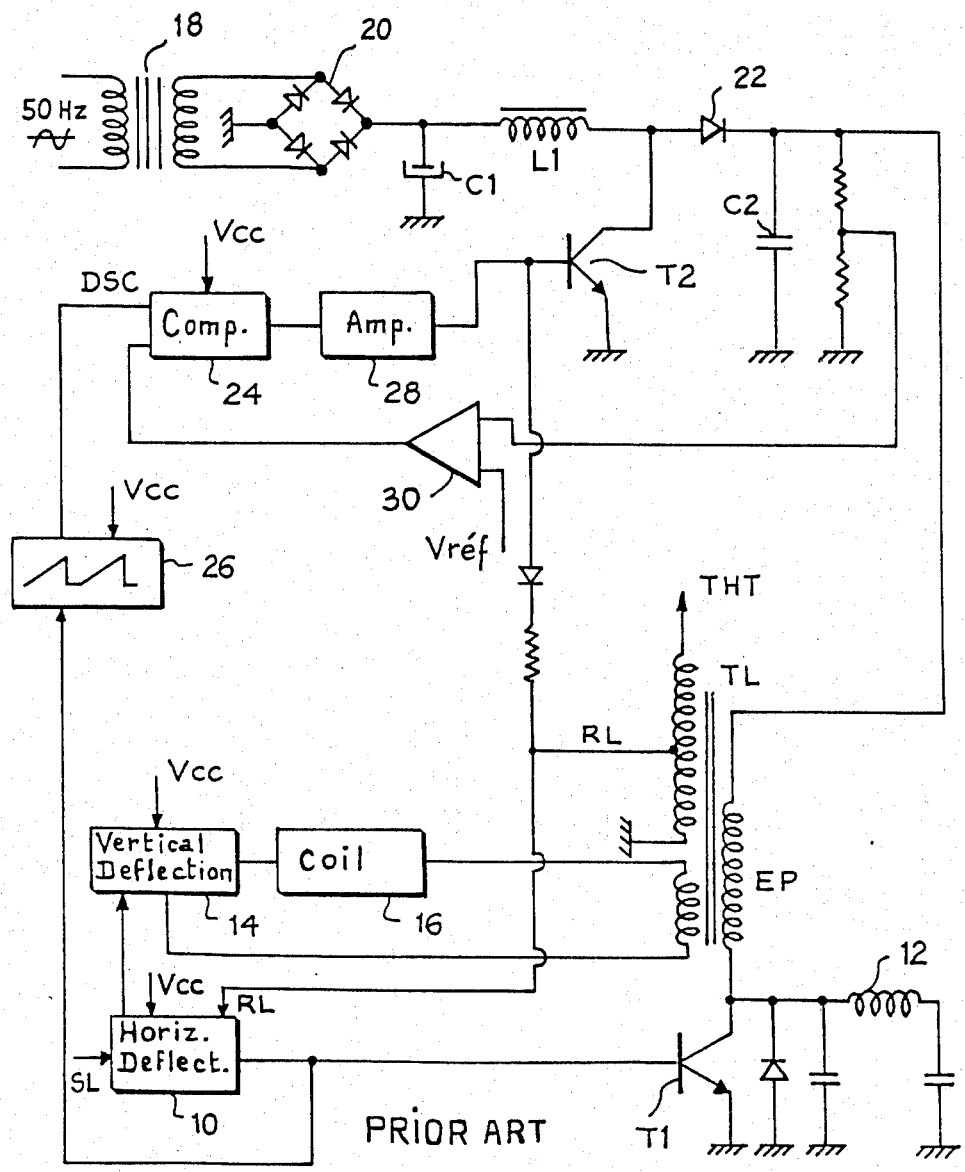

United States Patent [19]

Van Den Driessche

[11] Patent Number: 4,494,048
[45] Date of Patent: Jan. 15, 1985

[54] SCANNING CONTROL CIRCUIT FOR A TELEVISION RECEIVER, WITH GRADUAL STARTUP

[75] Inventor: Michel Van Den Driessche, Paris, France

[73] Assignee: Thomson-CSF, Paris, France

[21] Appl. No.: 444,799

[22] Filed: Nov. 26, 1982

[30] Foreign Application Priority Data

Nov. 27, 1981 [FR] France ............................... 81 22271

[51] Int. Cl.³ ........................ H01J 29/70; H01J 29/76
[52] U.S. Cl. ................................... 315/408; 315/411; 358/190
[58] Field of Search ................. 315/408, 411; 358/190

[56] References Cited

U.S. PATENT DOCUMENTS

| 4,188,641 | 2/1980 | Baker et al. | 358/190 |
| 4,245,180 | 1/1981 | Rilly et al. | 315/411 |
| 4,331,908 | 5/1982 | Rilly | 315/411 |
| 4,368,409 | 1/1983 | Sivanesan et al. | 358/190 |

Primary Examiner—Theodore M. Blum
Attorney, Agent, or Firm—Roland Plottel

[57] ABSTRACT

This invention concerns television scanning circuits.

It involves a scanning startup circuit comprising a capacitor, and means of gradual charging or discharging, to produce a priority voltage transmitted at startup to replace a control voltage, regulating a chopped power supply circuit which is to be started up progressively. At the end of a certain period of time, the regulation control voltage takes over from the original voltage which, at startup, is at a level such that it prevents over-consumption of current in power components. The circuit is also protected against voltage surges, being halted and restarted automatically and gradually in the event of such a surge.

5 Claims, 5 Drawing Figures

SCANNING CONTROL CIRCUIT FOR A TELEVISION RECEIVER, WITH GRADUAL STARTUP

This invention concerns television receivers, and more specifically circuits to control the sweep of the light spot produced on the television screen. In particular, it relates to the way in which such circuits start up when the receiver is switched on.

A television receiver usually contains a horizontal scan transformer, surrounded by several closely interconnected circuits:

stabilized supply circuit, providing a regulated DC voltage of about 100 volts, to supply the transformer;

horizontal scan control circuit supplying periodical signals to the base of a transistor mounted in series with the primary transformer winding, with a horizontal deflection coil connected to this transistor;

vertical deflection control circuit using a secondary winding of the horizontal scan transformer as source of supply, to produce a periodical voltage gradient for vertical scanning;

very high voltage circuit using a secondary winding of the transformer to create a high potential in the cathode-ray tube, for the purpose of producing and accelerating the electron beam.

In one embodiment, described in French patent application No. 81 08 337 of Apr. 27, 1981 on the present applicant's behalf, these different circuits are closely interconnected and precise provision has to be made for their startup and stoppage, taking account of their reciprocal interactions.

FIG. 1 shows the general layout of the horizontal and vertical scanning circuit, with a regulated chopped power supply circuit. This invention applies specifically to such a circuit. Further details are to be found in the aforementioned patent application, but the general structure will be described here, in order to define the purposes of this invention.

The horizontal scan transformer TL is provided with a primary winding EP, connected on one side to the collector of a transistor T1, the emitter of which is earthed, and on the other side to the output of a stabilized chopped power supply circuit, which is itself powered by the AC mains current.

A horizontal scanning control circuit 10 supplies the base of transistor T1 with periodical signals, synchronized with a synchronization signal SL, extracted by a synchronization extractor (not shown here) from the video signal reaching the receiver.

The transistor collector T1 is connected to a horizontal deflection coil 12, which produces a periodical deflection of the electronic beam of the tube at every changeover of transistor T1.

Transformer TL contains one or more secondary windings, e.g. one winding to produce a very high voltage THT, and another to activate a vertical deflection circuit. A line return signal RL, a negative pulse produced whenever the beam returns as a result of sudden blocking of transistor T1, is taken from one of these windings. This negative pulse RL is used for the horizontal scanning circuit 10, since scanning is synchronized with the syncronization signal SL by shifting the transistor T1 control signals until SL and RL are synchronized. The same pulse RL is also used to operate the chopped power supply circuit.

The vertical deflection circuit 14 is connected to a vertical deflection coil 16, and to a secondary winding of the transformer TL, and is also connected to the horizontal scanning control circuit, to ensure the necessary correspondence between line scanning and frame scanning.

The chopped power supply ciruit, comprises, following a transformer 18 powered by the mains, a rectifier bridge 20 followed by a filter capacitor C1 and inductance L1, mounted in series with the collector of a transistor T2, the emitter of which is connected to earth.

The collector of this transistor T2 is connected to the anode of a diode 22, the cathode of which is connected to a capacitor C2. The supply circuit output voltage reaches the terminals of this capacitor C2. The supply circuit functions by means of high-frequency switching (at the horizontal scan frequency) of transistor T2, by means of periodical signals (line scanning period 64 microseconds).

Capacitor C2 forms an energy accumulator, which discharges into the utilization circuit while transistor T2 is conducting, and which recharges through inductance L1 when transistor T2 is blocked; the width of the signals is automatically regulated, so that the charge lost every time transistor T2 becomes conducting is exactly counterbalanced by the charge regained during each blocking.

Regulation is obtained by taking a regulation control voltage at the supply circuit output, and comparing it with a stabilized reference voltage, the difference between them being amplified in a differential amplifier 30, and compared in a comparator 24 with a periodical sweep voltage, DSC, supplied at the line scan frequency by a generator 26, which to this effect receives signals at this frequency from the horizontal scanning circuit 10.

The comparator thereby supplies variable-width signals at this frequency, and these are amplified in an amplifier 28, and delivered to the base of transistor T2.

Finally, since transistor T2 has to block a high current every period, the strongly negative line return pulse RL from the secondary winding of transformer TL is delivered to its base. As already stated, RL is synchronized with the horizontal scanning signals from circuit 10, and therefore with returns of the sweep voltage DSC, so that a negative pulse encouraging blocking of transistor T2 appears immediately after delivery of a blocking signal from comparator 24.

The electronic control circuits are supplied with low-voltage DC current Vcc, obtainable either by rectifying a fraction of the mains AC current, or by taking a fraction of the DC voltage from the stabilized chopped power supply circuit, or even by a combination of both methods.

In conclusion, close interconnections exist among the chopped power supply circuit (operating at the horizontal scanning frequency), horizontal scanning circuit, vertical scanning circuit, and even very-high-voltage circuits. This invention is intended to perform the following functions relevant to this situation.

First, it is preferable for vertical scanning to function whenever horizontal scanning is in operation (something that involves the appearance of a very high voltage); otherwise, a motionless bright horizontal line is created on the screen, and this will ultimately burn out the photosensitive layer of the television tube.

Second, on startup of the chopped power supply circuit, when the receiver is first switched on, the regulation system will tend to make the comparator 24 generate signals of maximum length, until the supply circuit has reached its nominal output voltage. Current in transistor T2 increases in a linear way (because of inductance L1) during the period of the signal, resulting in far too high a consumption of current in the transistor during supply circuit startup, and serious overheating of the transistor, which has to cut out this high current (several amps) at high voltage (several hundred volts). In any case, the duration of these signals needs to be limited, for normal functioning of the supply circuit (e.g. by ensuring that the regulation control voltage cannot fall below a certain threshold). However, such limitation, although adequate during normal operation, does not eliminate the risk of destruction of transistor T2 during startup.

Apart from this startup problem, there is also the matter of stoppage of scanning circuits. The stabilized power supply circuit has to be switched off before horizontal scanning stops, since absence of scanning results in abnormal functioning of the power supply (removal of the sweep voltage and of the line return signal allowing transistor T2 to be properly blocked). When the supply circuit is off, scanning can be stopped, but horizontal and vertical scans have to be switched off simultaneously, and this should in fact not be done too quickly after the removal of power, since a very high voltage remains for some time, producing an electron beam which has to sweep the whole screen, so as not to risk burning a central point on it.

Finally, in exceptional cases, such as occurrence of overvoltage at a critical point, emergency switchoff of the supply circuit and scanning circuits must be possible, with automatic restarting, unless such voltage surges recur too quickly.

This invention aims to overcome such difficulties by means of a scan control circuit with a chopped power supply circuit, comprising a controlled switch (transistor T2) and a comparator or phase modulator 24, to produce control siqnals for this switch, the comparator being capable of receiving a variable regulation control voltage at one input and a sweep voltage at a second input, to produce signals of variable width, a startup circuit comprising a capacitor, means of having the potential of a first plate of the capacitor follow quickly the potential of a low voltage source Vcc, whenever this low voltage rises above zero to a value Vz, a priority transmission device, one input of which is connected to the first capacitor plate, while another input receives the regulation control voltage, and an output connected to the first comparator input, in order to ensure priority of delivery to this comparator input of whichever of the two voltages will produce narrower signals to cause the controlled switch to conduct, the value of Vz being such that when it is reached and the chopped power supply circuit is functioning, it is given priority for delivery to the comparator, to generate signals much shorter than the maximum possible length, and means of loading or unloading the capacitor gradually, in such a way that the potential of the first plate is gradually altered until it no longer has priority.

On startup, regardless of the regulation control voltage, signals making transistor T2 conduct are very short, since they widen as the capacitor discharges, until the supply circuit regulation control voltage takes over and issues signals, in accordance with normal functioning of the chopped power supply circuit.

Furthermore, control of horizontal and vertical scanning is inhibited if the low voltage is below a threshold VS1, and control of the chopped power supply circuit is inhibited until the lower voltage reaches a threshold VS2, above VS1.

The priority transmission device may, for example, comprise a pair of diodes or transistors.

Figure 2:
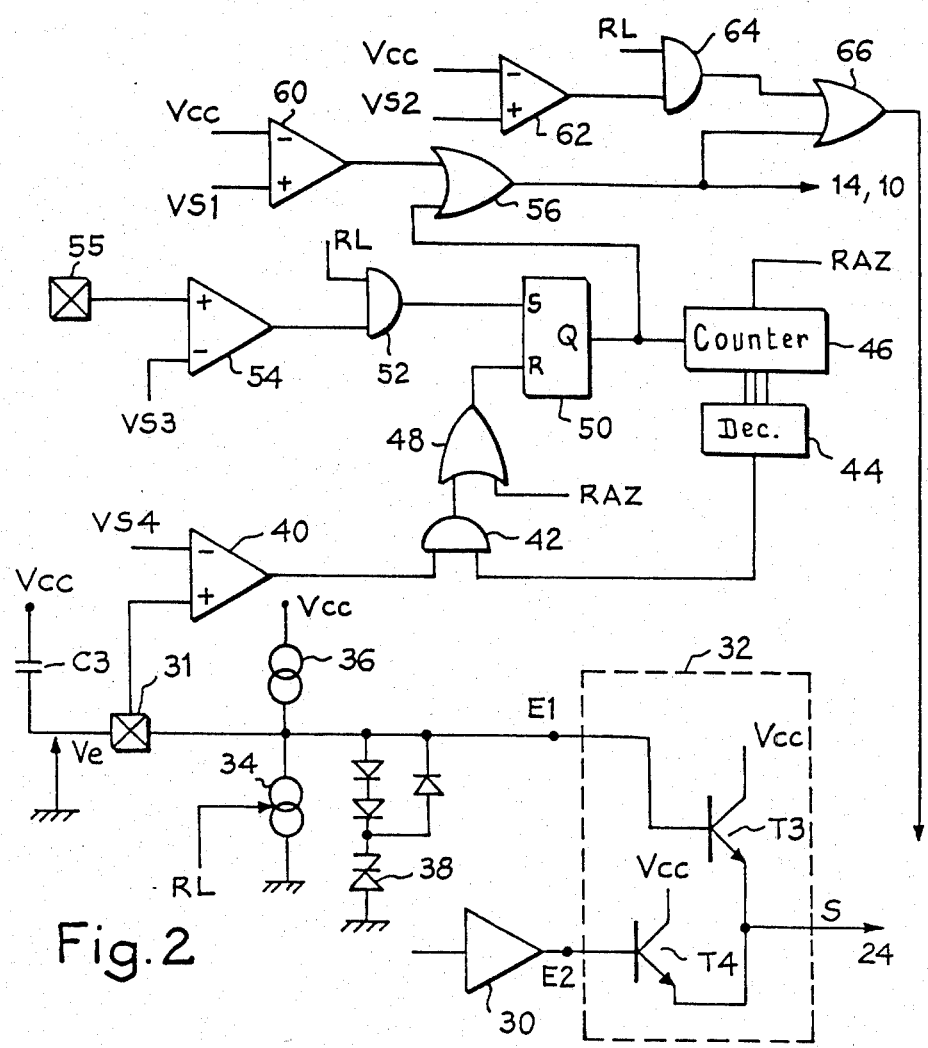
Figure 5:
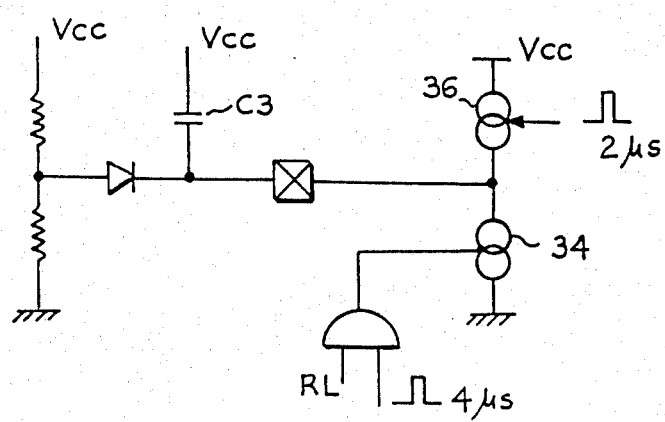
Figure 3:
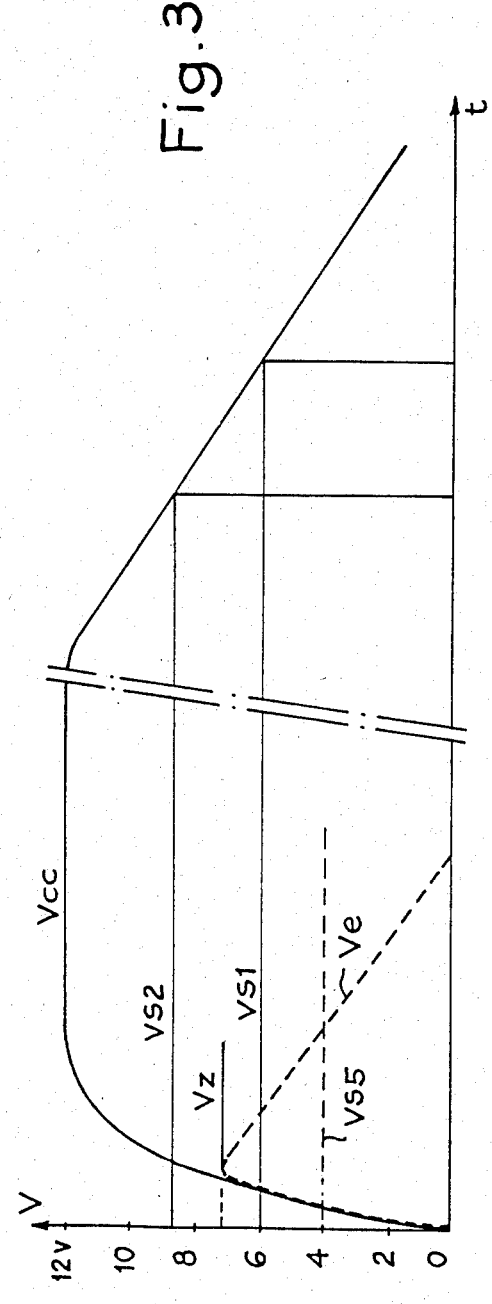
Figure 4:
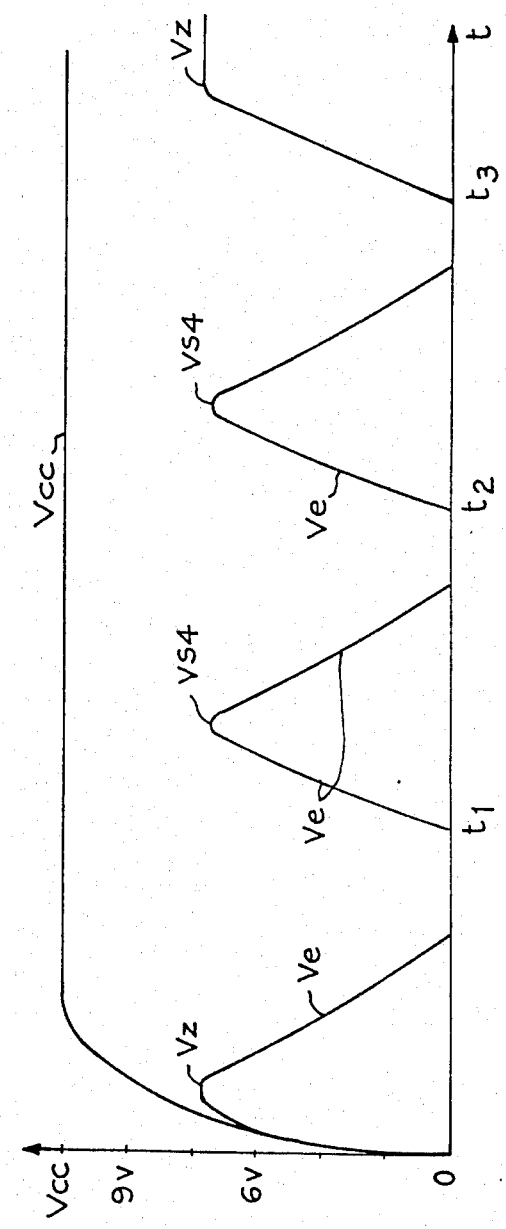

Other features and benefits of the invention will emerge from the following detailed description, with reference to the accompanying figures:

FIG. 1, already described, showing the general layout of a television receiver scanning circuit, particularly suitable for use with this invention;

FIG. 2, showing the startup circuit for the invention;

FIG. 3, showing a chart of voltages during receiver startup and stoppage;

FIG. 4, showing a chart of voltages in the event of voltage surges;

FIG. 5, showing a detail of the circuit.

FIG. 2 shows a capacitor C3, the first plate of which is connected to a terminal of a circuit 31, which is itself connected to an input E1 of a priority transmission device 32, possessing another input E2, which receives a control voltage to regulate the chopped power supply circuit in FIG. 1 (voltage taken from the divider bridge at the supply circuit output and amplified by amplifier 30). The priority transmission device output S is connected to the first input of comparator 24, the other input of which receives the sweep voltage DSC.

The priority transmission device 32 delivers the higher of the two voltages entering inputs E1 and E2 at its output S. To this effect, the device may, for example, comprise two transistors T3 and T4, mounted as follower emitters. Both emitters are connected to the output S, while the base of T3 is connected to input E1 and the base of T4 to input E2.

Transistor T4 can also in fact form part of the output stage of amplifier 30. The device may also comprise two diodes, instead of the base/emitter connections.

The second plate of capacitor C3 is connected to a low-voltage source, preferably the voltage Vcc used to supply all scan control circuits in the receiver, and which may be 12 volts, for example.

This voltage Vcc is obtained by rectifying a low-voltage AC current, which may be taken from the transformer 18 in FIG. 1. In one recommended embodiment (not shown here), arrangements may be made so that, when the scanning circuit has been started up, a rectified, filtered voltage, from the line transformer, takes over from the rectified filtered voltage from transformer 18, to provide the voltage Vcc.

The first plate of capacitor C3 is also connected to a charging device (current source 34) and discharging device (current source 36), to charge and discharge the capacitor fairly slowly (a few tens or even hundreds of milliseconds). The plate is also connected to a voltage limiter (Zener diode 38 and possibly additional diodes, to adjust the limiter output voltage to 6 or 7 volts). Current source 34 functions only in the presence of the line return signal RL.

Finally, the first plate of capacitor C3 is connected to the input of a threshold comparator 40, which delivers a positive logic signal when the voltage at the plate exceeds a threshold VS4 of about 6 volts.

The comparator output is connected to one input of an AND gate 42, another input of which receives the output signal from a decoder 44 at the output from a counter 46, in such a way that the AND gate theoretically opens when threshold VS4 is exceeded, except when a predetermined content of counter 46 is reached.

The output from the AND gate 42 is connected to one input of an OR gate 48, the other input of which receives a resetting signal RAZ, for resetting input R of a bistable flipflop 50, the output of which controls incrementation of a counter 46. This counter can also be cleared by the RAZ signal from a logic circuit (not shown here), producing a logic level resetting the flipflop and counter to 0, either when Vcc falls below a low threshold VS5, of about 4 volts (i.e. when the receiver is switched on again after complete stoppage); or at the end of a given period of time.

The flipflop 50 receives a switching control signal from an AND gate 52, one input of which receives the line return signal RL from the horizontal scanning circuit, while another input receives the output signal from a threshold comparator 54, which delivers a high logic level whenever any voltage surge appears at a safety terminal 55 connected to a critical point in the receiver.

One input terminal of comparator 54 accordingly receives the voltage from this critical point, while the other input is raised to a reference potential VS3.

When this threshold VS3 is exceeded, flipflop 50 is switched over at the next line return signal RL (and therefore on condition that horizontal scanning is taking place). This switchover increments the counter and stops the horizontal and vertical scanning circuits. Here, the output of flipflop 50 is connected through an OR gate 56 to the horizontal scanning control circuit 10 and vertical scanning control circuit 14, in order to inhibit functioning of these two circuits. OR gate 56 also receives a logic signal from a threshold comparator 60, which also delivers a scanning control circuit inhibiting signal whenever supply voltage Vcc falls below a threshold VS1 of about 6 volts, significantly higher than the threshold VS5 below which the clearing signal RAZ is issued.

Finally, a last threshold comparator 62 compares Vcc with a threshold VS2 of about 9 volts, higher than VS1, and transmits, through an AND gate 64 receiving the line return signal RL and an OR gate 66, a chopped power supply circuit inhibiting signal, for example a signal inhibiting comparator 24 which establishes signals of variable width, at the first line return after voltage Vcc has fallen below threshold VS2.

Another input of OR gate 66 is connected to the output from OR gate 56.

All threshold comparators comparing Vcc with a threshold have been shown with one input at Vcc and the other at the required threshold. In practice, it is preferable to compare a voltage KVcc with a single threshold voltage common to all comparators, the coefficient K varying from one comparator to another, controled by divider bridges. The common threshold voltage may be a reference voltage of 1.26 volts, a bandgap reference that is easily generated, and which offers very good temperature stability.

The description below covers functioning of the various parts of the circuit when the receiver is switched on, switched off, and also when repeated voltage surges occur at a critical point in the receiver.

FIG. 3 shows a time chart of voltages when the receiver is switched on and switched off.

When it is switched on (at time 0), voltage Vcc quickly reaches its nominal value of 12 volts (upper graph in FIG. 3).

The capacitor C3 is initially discharged, and its first plate (connected to E1) is at a potential Ve which initially follows the potential of the other plate, i.e. Vcc, up to a value Vz of about 7 volts, depending on the Zener diode limiter 38.

Before reaching Vz, voltage Vcc passes through a phase during which it is below a threshold VS5 of about 4 volts, causing resetting to 0 of flipflop 50 and counter 46. Vcc then passes through threshold VS1 of about 6 volts, causing, by means of comparator 60, simultaneous startup of horizontal and vertical scanning (which can function with a voltage Vcc of about 6 volts).

The appearance of horizontal scanning generates a periodical signal RL at the level of the horizontal scan transformer, thereby enabling the current source 34 (the average amplitude of which is greater than that of current source 36) to function, so that capacitor C3 begins to charge, reducing potential Ve, with a time constant of a few tens of milliseconds. The decrease in Ve is approximately linear overall, but in reality it takes place in a stepped fashion, each line return signal RL causing a small drop in the capacitor load. Meanwhile, almost as soon as scanning starts, voltage Vcc has passed through threshold VS2 of about 9 volts, enabling the chopped power supply circuit to function.

Ve is therefore initially about 7 volts, i.e. much higher than the regulation control voltage delivered to the chopped power supply circuit. This control voltage tends to be at its minimum level, to produce, by comparison with the sweep voltage DSC, very wide signals. In fact, voltage Ve is transmitted with priority through transistor T3, so that narrow signals are produced. The width of the signals increases as Ve falls; the chopped power supply circuit gradually reaches normal operating conditions, and the regulation control voltage rises. The system is thus in a phase of gradual startup of the power supply circuit.

After a certain period, voltage Ve has dropped to a level below the regulation control voltage, which has risen with the supply circuit output voltage. The regulation control voltage thereupon takes over from voltage Ve in the priority transmission device 32, initiating a phase of normal regulation of the power supply circuit.

Because the chopped power supply circuit cannot begin to function until Vcc is above VS2 (9 V), whereas scanning is already in operation from VS1 (6 V), the line return signal RL is still present, as well as the sweep voltage DSC, to ensure proper functioning of the supply circuit.

When the receiver is switched off, Vcc falls gradually, for lack of mains supply. When it drops below VS2 (9 V), functioning of the chopped power supply circuit is inhibited at the next line return signal RL (comparator 62 and AND gate 64). The power supply is therefore switched off in the blocked state of transistor T2 in FIG. 1.

Vcc then falls below VS1 (6 V), stopping scanning. Meanwhile, the supply circuit output voltage has dropped, so that the very high voltage has itself fallen; the electron beam is therefore no longer so intense when scanning stops, and there is no danger of an intense motionless beam burning any point on the screen.

Occurrence of voltage surges at a critical point on the circuit is illustrated in the voltage chart in FIG. 4, showing potential Vcc from the time of switching on the receiver, and potential Ve from the time of switching on and after the appearance of three successive voltage surges, resulting, for instance, from an ionizing discharge in the cathode-ray tube at the start of its lifespan.

At switch-on (time 0), potential Vcc rises from 0 to 12 volts. Potential Ve follows it, stabilizing at Vz (about 7 volts), after which it decreases slowly, to establish the gradual startup phase of the chopped power supply circuit as already explained in connection with FIG. 3.

A voltage surge is assumed to occur at time $t_1$, causing threshold VS3 (which can be regulated as necessary, to suit the voltage surges to be detected), to be exceeded at the input to comparator 54, which therefore delivers a signal switching over flipflop 50 at the first line return signal RL after the threshold has been exceeded. Counter 46, initially reset to 0, because Vcc has passed through a level below 4 volts during switching-on of the receiver, is incremented by a unit.

Simultaneously, the flipflop output delivers a signal through OR gate 56, to inhibit horizontal and vertical scanning, and through OR gate 66, to inhibit the chopped power supply circuit.

Since there is no further horizontal scanning, current source 34 can no longer keep capacitor C3 charged, and current source 36 begins to discharge it slowly, raising potential Ve.

When Ve reaches threshold VS4, comparator 40 delivers a logic signal which resets flipflop 50, simultaneously causing restarting of scanning, and the chopped power supply circuit since Vcc has remained at 12 volts in the meantime.

Horizontal scanning causes reappearance of the periodical line return signal RL, and current source 34 can once again charge capacitor C3, causing potential Ve to fall gradually, initiating a phase of gradual startup of the supply circuit.

Further surges can occur, for example at times $t_2$ and $t_3$. The same procedure prevails, unless the content of counter 46 is high enough for the decoder 44 to deliver a signal blocking AND gate 42, therefore blocking resetting of flipflop 50. If the decoder is programmed for example, to deliver a blocking signal when the contents of the counter indicate the third successive voltage surge without resetting to 0 (it should be remembered that resetting can occur either when the receiver is switched off, or after a certain period), the voltage surge occuring at time $t_3$ will again cause simultaneously stoppage of scanning and of the chopped power supply circuit at the first line signal RL after appearance of the voltage surge, and therefore raising potential Ve. But decoder 44 will prevent resetting of the flipflop and therefore startup of scanning circuits and supply circuit Ve will stabilize at the level Vz determined by the limiter. No fresh startup can occur until the receiver has been switched off and on again.

The number of surges and the period for which they can occur without causing definite stoppage of scanning circuits can be selected as required.

The clock governing the period within which n succeeding surges (where n is 3, for example) must not occur can be formed of a monostable flipflop (not shown here), tripped by the first status-change in the counter, or of any other timing device. The counter and flipflop can also be cleared periodically, every 20 milliseconds, by resetting to 0 of the vertical scan.

FIG. 5 shows a constructional detail illustrating a further improvement. The circuit in FIG. 1 remains unchanged, but only the capacitor C3 and current sources 34 and 36 are shown here.

These current sources supply current of the same amplitude, but they are activated during different periodical time intervals. The time interval for control of source 34 lasts 4 microseconds on each period (provided that the line return signal RL is present); this time interval is established by a logic circuit, and is located within the duration of the RL signal. The interval controlling source 36 lasts 2 microseconds for each horizontal scanning period, and can be generated from a 500 kHz clock and a logic circuit allowing a single clock impulse to pass for each horizontal scanning period.

In the presence of RL, the average value of currents delivered means that capacitor C3 charges; in the absence of the signal, it discharges.

Provision can also be made for the lower level of voltage Ve to be limited, by a voltage from a divider bridge supplied by voltage Vcc. A diode providing a direct polarization link between the divider bridge and the first plate of capacitor C3 prevents Ve from falling below a certain level. This obviously involves absolute limitation of the width of signals which the chopped power supply circuit comparator 24 can supply.

If the scanning circuit is an integrated circuit (except for power components), capacitor C3 is kept outside this integrated circuit, as well as the divider bridge and diode, so that maximum signal width can be adjusted at will.

In the description above, the first plate of capacitor C3 has to follow potential Vcc quickly, when the receiver is switched on. For this purpose, the second plate is connected to the low-voltage source Vcc. This plate could also be earthed, and a fairly intense additional current source included, activated only when Vcc is below a threshold of 8 to 10 volts. Such a source would be parallel to source 36, and would cease to function once Vcc reached its nominal level of 12 volts.

What is claimed is:

1. In a television receiver comprising a switched mode power supply and a scanning control circuit, said power supply circuit comprising a power switching element (T2) and a pulse-width modulator (24, 26) having an input for receiving a modulating voltage and an output for providing pulses of modulated width, wherein said scanning control circuit comprises, in view of ensuring gradual start-up of scanning:

supply terminals for receiving a low voltage supply (Vcc), a capacitor (C3) having a first plate and a second plate which are connected to said supply terminals in such a way that upon starting up of the receiver, said first plate will follow the rising potential of one supply terminal, a voltage limiter (38) to limit the voltage on said capacitor first plate to a predetermined value Vz, an analogic voltage transmission device (32) having a first input connected to said capacitor first plate, a second input for receiving a control voltage which may vary between predetermined limits, and an output which is connected to the input of said pulse width modulator, said voltage transmission device being designed so that its output will transmit either the voltage on its first input or the voltage on its second input, depending on the relative magnitude of these voltages, the transmitted voltage being the one which corresponds to the narrower pulse width at the output of the pulse width modulator, the value of Vz being such that it corresponds to a pulse width narrower than the minimum pulse width that may be produced by the modulator when said modulator receives the said control voltage from the transmission device,
means (34) for progressively altering the electrical charge of said capacitor so as to vary the potential of its first plate in a sense corresponding to an increase of the pulse width defined by this voltage.

2. A circuit as claimed in claim 1 wherein said second plate of the capacitor is directly connected to said one supply terminal.

3. A circuit as claimed in claim 1, wherein said means for progressively altering the charge of said capacitor comprises a current source controlled so as to supply current to the capacitor only when receiving fly-back pulses indicating that horizontal scanning is operating.

4. A circuit as claimed in claim 1 further comprising a threshold comparator (62) having one input receiving said low voltage supply and another input connected to a voltage reference, and an output for supplying to the pulse width modulator a disabling signal whenever said low voltage supply falls below a predetermined value (VS2).

5. A circuit as claimed in claim 3, wherein a second means for gradually altering the electrical charge of said capacitor is provided, said second means comprising a current source connected to the capacitor in such a way that it will change the voltage on the first plate in a sense corresponding to a decrease of the pulse width defined by this voltage.

* * * * *